April 8, 1952     W. MURRAY     2,591,852
AUTOMATIC CONTROL FOR ELECTRIC HEATERS AND OTHER PURPOSES
Filed April 29, 1949
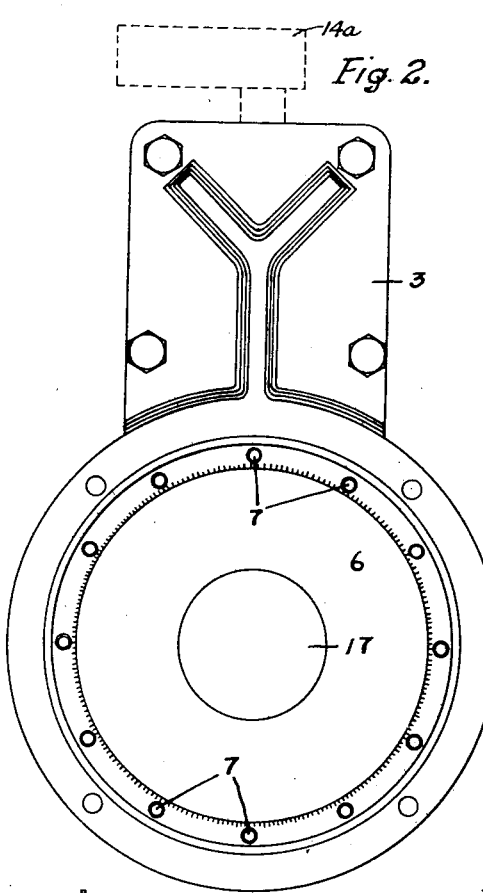
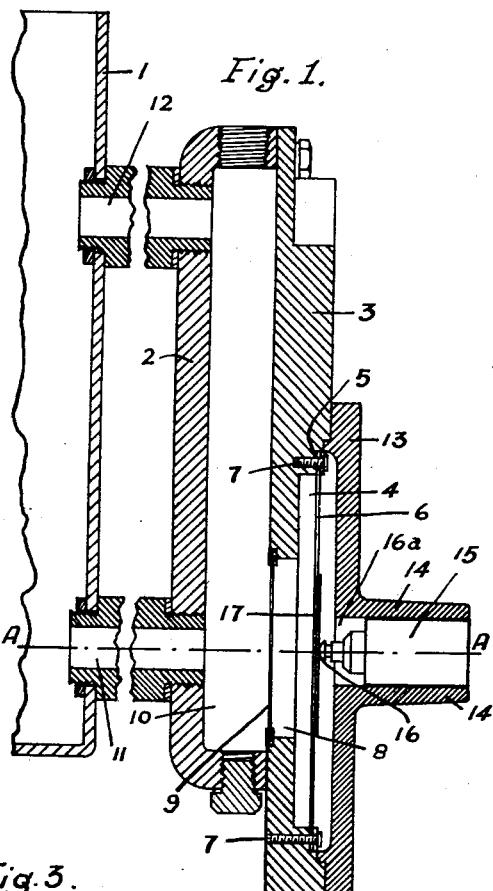
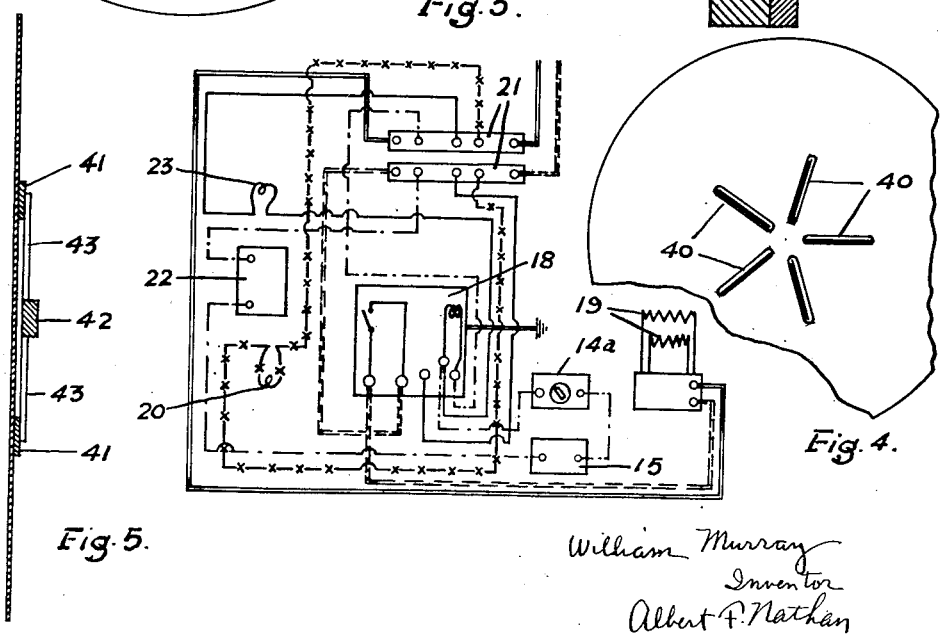
William Murray
Inventor
Albert F. Nathan
Atty Patented Apr. 8, 1952

2,591,852

UNITED STATES PATENT OFFICE 2,591,852

AUTOMATIC CONTROL FOR ELECTRIC HEATERS AND OTHER PURPOSES

William Murray, Leamington Spa, England

Application April 29, 1949, Serial No. 90,376
In Great Britain May 3, 1948

2 Claims. (Cl. 219—38)

The present invention relates to automatic controls with flexible diaphragms of less than 15 mils thickness wherein the outer periphery of the diaphragm is secured to a housing and another part of the diaphragm is adapted to be displaced by variations in fluid pressure and to move a control member which opposes the said movement and more particularly control apparatus incorporating diaphragms of the kind defined wherein the control member forms part of a device for making or breaking an electric circuit.

In known diaphragms of uniform thickness the said opposition to movement causes the flexure of the diaphragm to be reduced or reversed in a zone surrounding the point of opposition. This reduction or reversal of flexure is hereinafter called "relative flexure." In consequence of this relative flexure the maximum displacement of the diaphragm does not take place at the point of opposition but in a zone lying between the point of opposition and the outer periphery of the diaphragm. This relative flexure lessens the sensitivity of the control apparatus in which the diaphragm is embodied and one object of the invention is to provide, for use in such control apparatus, an improved form of diaphragm which will provide greater sensitivity, by which term I means that the diaphragm will be adapted to move the control member with smaller variations of fluid pressure than would be required with a diaphragm of the same external dimensions and uniform thickness in the same control apparatus.

The invention consists of an automatic control apparatus comprising a flexible diaphragm secured by its outer periphery to a housing and adapted to be displaced by fluid pressure and having a relatively less flexible centrally disposed zone which when displaced will actuate the actuating member of a micro-switch, the thickness of the relatively more flexible part of the diaphragm being less than 15 mils and the area of the said centrally disposed zone being not less than one-eighth and not more than one half of the area of the relatively more flexible part.

By the term "micro-switch" herein and in the claims hereof mentioned I mean a snap-action electric switch which includes the combination of a thin leaf spring operatively supported in cantilever fashion at one end thereof, parallel adjacent compressed spring means pivoted at a point between the ends of the said leaf spring and operatively connected with it at its free end, the free end of the said leaf spring being free to move said adjacent spring means and a pair of stops between which the free end of the said leaf spring moves, the pivot points of the said springs being in fixed relation to the said stops and the arrangement preferably being such that the force required to move the free end of the said leaf spring has an accelerated drooping curve characteristic as the free end is moved.

Switches of the type defined are described and claimed in the complete specification of British Letters Patent No. 419,917. I make no claim to switches of the type defined save in combination with flexible diaphragms constructed and arranged in accordance with my invention and as claimed herein.

I have found that centrally disposed zones with areas between one-fifth and one-third of the area of the peripheral zone provide particularly useful results.

The said reduction of flexibility may be obtained by using a less flexible or a thicker material in the centrally disposed zone or by stiffening the material by means of ribs or flutings and the material connecting the centre with the periphery of the centrally disposed zone may form part of the diaphragm or may be connected to the diaphragm around the periphery of the centrally disposed zone.

The improved control apparatus is especially applicable to the control of the electric heaters of rinsing tanks as used in dish washing machines and it will be hereinafter more particularly described in relation to these applications although it is to be understood that it is not limited thereto.

My invention provides in one application thereof a control apparatus which is responsive to a fall in the level of a liquid, as in dish washing or rinsing tanks in connection with which electric heating means are provided, whereby through the medium of the micro-switch, and a suitable relay, the supply of electric current to the heating means may be controlled, so that damage to the heaters due to their becoming overheated may be obviated or lessened.

I have found that even the resistance opposed by a micro switch to movement of the centre of a diaphragm of uniform thickness results in the maximum movement of the diaphragm not occurring at the centre where the movement is required, but in the aforesaid surrounding peripheral zone and, in consequence thereof, reverse curvature and lost motion occur and the sensitivity of the control is reduced. A more positive movement of the central portion of the flexible diaphragm and a more sensitive response is obtained when a diaphragm according to the present invention in used.

In this way it becomes possible to design a control which can be made responsive to a very small movement of diaphragm and this can be made use of for controlling the electric heaters of washing and rinsing tanks by subjecting the diaphragm to the hydrostatic pressure of the water in the tank, a small difference in the level of which can be made to suffice to work the control by suitably choosing the size and flexibility of the materials in the two zones of the diaphragm in relation to the resistance offered by the microswitch.

The depth of liquid at which the diaphragm is effective to procure the required movement of the micro-switch is a measure of the sensitiveness of the control. For example a control which operates when the height of water above the central line through the diaphragm equals ten inches is to be regarded as of low sensitiveness compared with one which operates at a level of two to four inches. For example, a copper diaphragm of the proportion hereinafter described but of uniform thickness will flex in response to the hydrostatic pressure of water at a level as little as two inches above the centre line through the diaphragm, but owing to the plunger resistance of the microswitch the flexure takes place in the said peripheral zone of the diaphragm and may be insufficient to produce the necessary movement of the centre of the diaphragm to overcome the resistance of the plunger and cause the latter to be effective. I have found that to produce the necessary movement of the centre of such a diaphragm the level of water may have to rise as high as ten inches or more above it.

By constructing the centrally disposed zone of the diaphragm according to the present invention, sufficient movement to operate the plunger may be produced at water levels as low as two inches above the centre of the diaphragm, and at these low pressures the stiffened centre portion moves bodily with the unstiffened surrounding portion with little or no relative flexure.

This stiffening of the material in the centrally disposed zone is obtained in one form of the present invention by making the material of the diaphragm thicker in the centrally disposed zone than in the surrounding peripheral zone.

In another form of the present invention the stiffening may be obtained by fixing a ring to the diaphragm and connecting the ring to the centre of the centrally disposed zone by spokes or other relatively stiff mechanical connections.

In yet another form of the present invention the stiffening may be obtained by fixing a stiffening plate to the diaphragm, the said plate having an area within the limits hereinbefore mentioned.

The said ring or plate may form part of the said control member.

The application of a control device, according to the invention, to the water-operated control box of an electrically heated crockery washing machine of a known type is illustrated in the accompanying drawings, in which:

Fig. 1 is a vertical section through the control box and Fig. 2 is a face view with the cover removed.

Fig. 3 is an electrical diagram of the heating unit of such a machine.

Fig. 4 is a cross sectional view of a modified form and Fig. 5 a similar view of another modified form of diaphragm according to the invention.

The washing machine comprises a washing tank one wall of which is marked 1 in Figs. 1 and 2. The water-operated control box 2 is fitted to the outside of such wall.

The coverplate 3 of the box contains a disc like casing 4 internally recessed at 5 to receive a diaphragm 6, which is peripherally clamped in position by screws 7. The interior of the casing 4 communicates by way of an opening 8, covered with gauze 9, with the chamber 10 formed in the box and this chamber communicates boiler-glass fashion with the rinsing or washing tank by way of passages 11 and 12 and is situated so as to enable the diaphragm to respond to liquid levels of 4 to 6" and about 2" above the line A—A. Tubes fixed to the tank ensure a thermo-syphonic flow of the water which fills the tank and acts upon the diaphragm through chamber 10.

The cover 13 of the disc like chamber is fitted with a pair of projecting flanges 14, 14 between which a microswitch 15 is mounted so that its plunger 16 passes through a central hole 16a in the cover to bear against the diaphragm. The centre of the diaphragm is stiffened by an attached disc 17 of the same material as the main part of the diaphragm. A suitable proportioning of the diaphragm is:

Outside diameter _____ 6.2"
Diameter of unclamped area _____ 5.4"
Diameter of disc 17 _____ 2.25"

Material: Copper or beryllium—

Thickness _____mils__ 7
    Total thickness of central area ___do____ 60

The switch is in the circuit of a relay 18 (Fig. 3) and when operated by the diaphragm closes the circuit of the electric heaters (two of which are indicated at 19 in Fig. 3). The switch is closed when the water in the tank rises to a sufficient level to operate the diaphragm, but if the level is insufficient for this purpose, or there is no water in the tank, the spring force within the switch behind the plunger acts to return the centre of the diaphragm and open the circuit through the relay to cause the heaters to be switched off.

In cases where it is desired to have the power of adjustment to vary the level at which the diaphragm is to be responsive to operate the micro-switch, it is practicable pivotally to mount the metal casing of the micro-switch at its upper end between the flanges and provide the lower end with a screw adjustment for example reacting against the cover for adjusting the end of the plunger with respect to the stiffened portion of the diaphragm, lock nuts being provided on the screw adjustment for locking the adjustment in its set position.

Fig. 3 shows a known heater unit circuit for the washing machine. It includes a mains lamp 20 connected to the bus-bars 21, 21. This lamp lights up when a main wall switch (not shown) is switched on and the bus-bars are energised. The manually operated heater switch 22 is now switched on. When the water in the tank reaches a depth of say 2" above the centre of the diaphragm the pressure will be sufficient to operate the diaphragm and close the micro-switch 15. Through the operation of relay 18 the circuit shown by the double dash-lines and the double full-lines of the heaters is closed as is also the circuit of a lamp 23. Two heaters are diagrammatically shown although more than two heaters, e. g., four are generally used.

The relay indicated in Fig. 3 is a well known component known as the "Satchwell contactor" made by The Rheostatic Co., Ltd., of Slough, England under British Patents Nos. 317,711 and 386,717, and is described as the RA1 type maximum current (heating load) 30 amps. 0/250 volts, cycles 50, pole 1, coil volts 200/250 contactor.

To the upper end of the water-box is fixed a thermostat 14a which is arranged in the circuit of the micro-switch and operates at a water temperature of 190° F., to switch off the lamp 23 and the heaters.

The current to the heaters may thus also be manually controlled by the finger operated switch 22 on a panel which may have illuminated windows showing green for the lamp 23 for normal working and only red for the lamp 20 for abnormal conditions such as had led to the heaters being cut out because the tank is empty or the level of the water therein has fallen dangerously low.

The stiffening disc of the diaphragm should be of like material thereto in order to obviate any bi-metallic effect.

Fig. 4 shows a modified form of the diaphragm in which the centrally disposed zone is stiffened by means of radial ribs or flutings 40 pressed up from the metal of the diaphragm, and Fig. 5 shows another modified form in which a ring 41 is fixed to the diaphragm and is connected to a central hub 42 by means of spokes 43 or other relatively stiff mechanical connections.

Among other applications of the present invention may be mentioned the control of electric pumps, e. g., a borehole pump operating in the basement of an hotel, with storage headed tank on top of the building. When water in the tank drops to a predetermined level the micro-switch cuts in and starts up the pump via the relay. When the tank is filled to the required height the pump cuts out. The heights would be controlled by the corelation of diaphragm area and thickness. The invention may also be applied to the control of oil pumps, feed or overflow valves and pressure control or warning devices.

In some cases the resistance of the diaphragm may be augmented by a spring which could be calibrated to suit the desired difference in level between that in the tank and that at the line A—A, at which the apparatus is to function.

What I claim is:

1. A washing means comprising a water heating unit including a casing providing a chamber with at least one opening, an electromagnetic relay and at least one electric heater, a control member including a sensitive switch for operating said relay and comprising a plunger, a flexible metallic diaphragm, said plunger being adapted to be actuated by the movement of the said diaphragm, said diaphragm having a free portion responsive to the hydrostatic pressure of liquid admitted through said opening on the side opposite said plunger, said free portion consisting of a central zone and a peripheral zone, said peripheral zone being of a thickness less than fifteen mils, said plunger opposing a resistance to displacement by the diaphragm tending to cause its maximum displacement to occur around a zone between the centre and periphery of such free portion, and means defining and stiffening said central zone over an area not less than one-eighth and not more than one-half of the area of said peripheral zone so as to ensure that the maximum displacement of the diaphragm is at the said central zone and to lower the hydrostatic pressure necessary to operate the diaphragm.

2. An automatic control apparatus comprising a flexible diaphragm, a housing therefor and a micro-switch, said diaphragm being secured by its outer periphery to a housing and adapted to be displaced by a fluid pressure and having a relatively less flexible centrally disposed zone which when displaced will actuate the actuating member of the micro-switch, the thickness of the relatively more flexible part of the diaphragm being less than 15 mils and the area of the said centrally disposed zone being not less than one eighth and not more than one half of the area of the relatively more flexible part.

WILLIAM MURRAY.

REFERENCES CITED

The following references are of record in the file of this patent:

UNITED STATES PATENTS

| Number | Name | Date |
| --- | --- | --- |
| 79,669 | Matthes | July 7, 1868 |
| 1,182,688 | Kirby | May 9, 1916 |
| 1,196,487 | Simon | Aug. 29, 1916 |
| 1,205,010 | Pearson | Nov. 14, 1916 |
| 1,480,174 | Matthews | Jan. 8, 1924 |
| 1,561,243 | Keene | Nov. 10, 1925 |
| 1,615,299 | Bossi | Jan. 25, 1927 |
| 1,620,493 | Schindler | Mar. 8, 1927 |
| 1,907,845 | Macrae et al. | May 9, 1933 |
| 2,061,905 | Hewitt | Nov. 24, 1936 |
| 2,094,319 | Faust | Sept. 28, 1937 |
| 2,307,066 | Paulus | Jan. 5, 1943 |
| 2,315,758 | Willits | Apr. 6, 1943 |
| 2,406,719 | Upson | Aug. 27, 1946 |
| 2,444,163 | Kocmich | June 29, 1948 |
| 2,478,814 | Ferris | Aug. 9, 1949 |
| 2,487,947 | Senn | Nov. 15, 1949 |